Oct. 18, 1966  J. P. KOTTENSTETTE ETAL  3,279,602
MAGNETIC SEPARATION PROCESS AND EQUIPMENT THEREFOR
Filed Feb. 18, 1963  2 Sheets-Sheet 1

INVENTORS
JAMES P. KOTTENSTETTE
DAVID C. CARD, JR.
LAWRENCE E. JONES
BY J. KENT PERRY

*M<sup>c</sup>grew & Edwards*
Attorneys

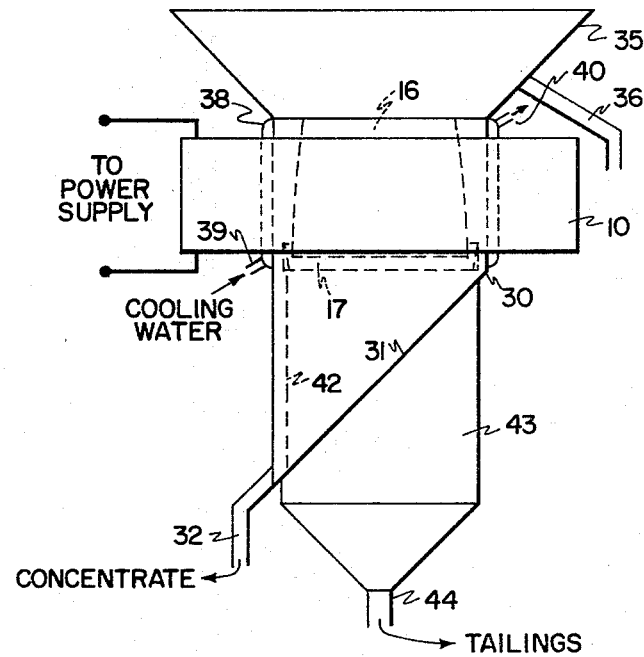
FIG. 5
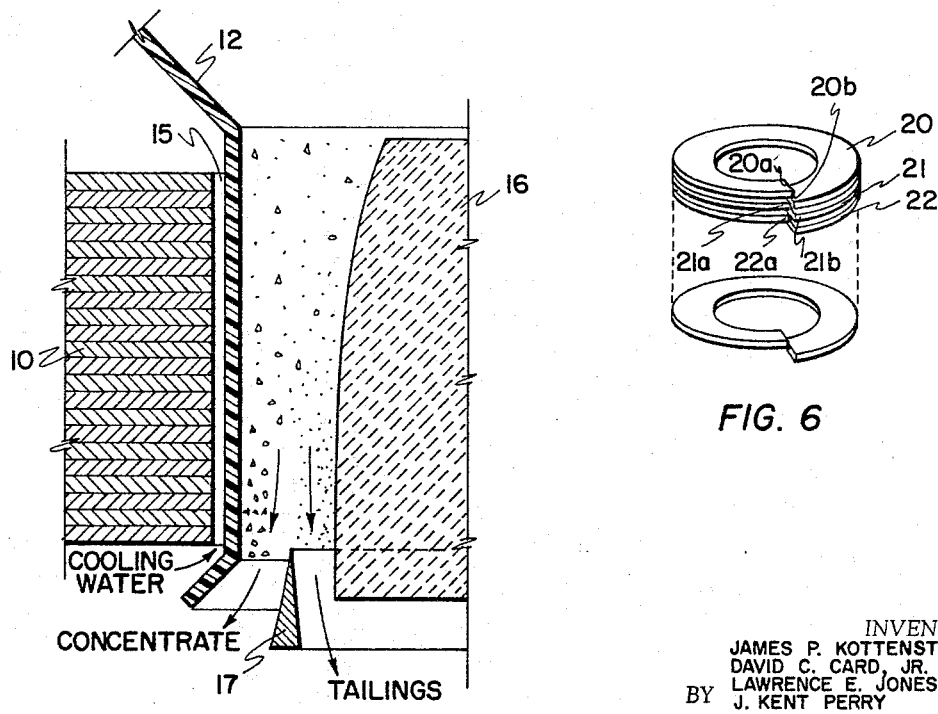
FIG. 7
FIG. 6

United States Patent Office 3,279,602
Patented Oct. 18, 1966

3,279,602
MAGNETIC SEPARATION PROCESS AND
EQUIPMENT THEREFOR
James P. Kottenstette and David C. Card, Jr., Denver, and Lawrence E. Jones and J. Kent Perry, Golden, Colo., assignors to et al, inc., Denver, Colo., a corporation of Colorado
Filed Feb. 18, 1963, Ser. No. 259,331
10 Claims. (Cl. 209—214)

This invention relates to a process for separating materials of magnetic susceptibility from materials having no magnetic susceptibility and equipment for such separations, and more particularly to a pulsed, high gauss field magnetic separation and/or concentration process for materials having a magnetic susceptibility and to the apparatus for such process.

The magnetic separation for materials of high magnetic susceptibility has been known for years, and many different types of separators are available commercially for such highly susceptible materials. Separators may be wet or dry and act on coarse or fine feed. In the magnetic separation of various metallic ores, the force of a magnetic field coacting with some other force is utilized in the separation. The magnetic field itself causes some differential movement or segregation of the material which is susceptible to the magnetic field, but the actual separation of the particles is due to another force, as for example gravity, flow of fluid, and the like. In the known separators the magnetic field is of a continuous or continuously varying type and is produced either by direct or alternating current. Where a direct current magnet is used some sort of a collecing surface is necessary to remove the magnetically susceptible material from the non-magnetically susceptible material, and then some means is necessary to remove the magnetically susceptible material from the collecting surface. In another type of separator which is called a pickup separator, feed does not come directly into contact with the collecting surface but is conveyed by suitable means through a magnetic field so that the magnetically susceptible particles are attracted and moved a short distance to a moving surface which transports them beyond the magnetic field and away from the non-magnetically susceptible material. The alternating current magnet produces a reversing field from positive to negative for the magnetic separation and it also requires some other force for the actual separation.

According to the present invention, we have provided a magnetic separator which utilizes a pulsed magnetic field for the efficient and effective separation of magnetically susceptible particles from other materials, and such particles may generally extend from a high magnetic susceptibility to an extremely low magnetic susceptibility. The magnetic separator or concentrator of the invention utilizes a solenoid without a magnetic core and the feed material for separation is subjected to a very high magnetic field adjacent the inner surfaces of the solenoid for an efficient separation or concentration of the susceptible particles. The device of the invention may be utilized for dry separation or concentration as well as a wet separation or concentration where the material to be separated is suspended as a slurry in a fluid carrying medium. The power for the magnet of the invention may be supplied by an alternating current and by using proper switching the power is applied to the magnet only through one-half or less of each cycle without a polarity change so that the field is actually pulsed. The magnet may be powered by a direct current controlled by a timed switching circuit to power the magnet for a predetermined time and shut off the current for a predetermined time. In one form of the invention, voltage is rapidly impressed on the solenoid so the field goes from zero or no intensity to maximum intensity and back to zero without reversing the current in the magnet. In one application a solenoid is powered only in one portion of a half cycle of an alternating current cycle, so that the solenoid is subjected initially to about maximum voltage until the polarity changes and no voltage is applied for the remainder of the cycle. The invention, also, provides for the method of separating ore values or materials of very low magnetic susceptibility at relatively low power requirements and under extremely high magnetic fields.

Included among the objects and advantages of the present invention are methods of separating and concentrating magnetically susceptible materials in a pulsed magnetic field whereby particles passing through the magnetic field are progressively subjected to a periodic extremely high magnetic field. In one form of the invention, the method includes the beneficiation of paramagnetic materials in a pulsed magnetic field wherein the materials may include values with a magnetic susceptibility of as little as about $1.8 \times 10^{-6}$ c.g.s. or greater in an extremely high gauss pulsed magnetic field with a high gradient. The invention includes the apparatus for performing the method of the beneficiation wherein a solenoid-type magnetic field is induced in an annular or a portion of an annular stream of value carrying fluid medium so that the values of the material are intermittently subjected to a high intensity high gradient magnetic field in passage through the area of the magnetic field. The apparatus of the invention provides means for producing a pulsed high intensity, high gradient magnetic field which extends from a maximum voltage to zero voltage for predetermined times.

These and other objects and advantages of the invention may be readily ascertained by referring to the following description and appended illustrations in which:

FIG. 5 illustrates one form of apparatus according to the invention, including means for feed, discharge of the concentrate and discharge of the tailings;

FIG. 6 illustrates one form of assembly of a magnet of the invention, including the forming of the elements of the coil; and FIG. 7 shows an enlarged detail view of a portion of the magnet and separation assembly according to the invention.

Figure 2:
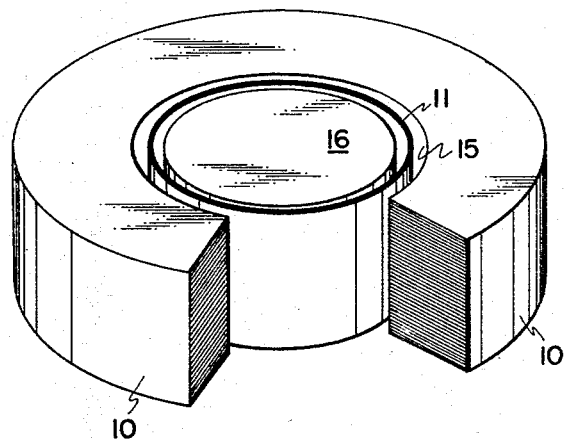
FIG. 2 is a perspective detail, including a cut-away portion of the magnet, illustrating the spacing of the portions of the structure which is subjected to maximum intensity of a magnetic field.
Figure 1:
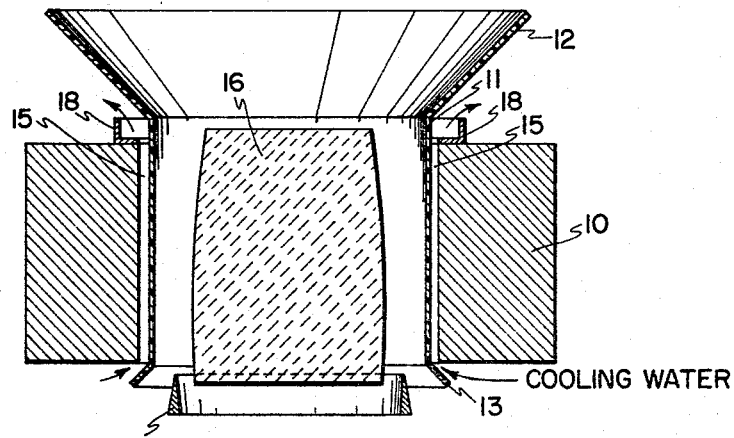
FIG. 1 is a cross-sectional elevation of one form of magnetic separator according to the invention.

In the device illustrated, a laminated coil or solenoid 10, shown in detail in FIGS. 6 and 7, is provided with a liner 11 having an upper funnel shaped opening 12 and a lower, smaller funnel shaped opening 13 spacedly mounted in the center aperture of the annular coil 10. A small annular space 15 is provided between the inner surface of the coil and the liner which provides space for a flow of cooling water. A center core member 16 is provided internally of the liner 11 and a splitter ring 17 is adjustably mounted at the lower end of the liner 11 but spaced therefrom. The liner, the core and the spacer ring may be mounted in any convenient manner so as to be securely held in position in the coil 10. Under normal circumstances the splitter ring 17 should be adjustable in a vertical direction to provide for a close adjustment for splitting the annular stream of ore pulp passing through the device.

In one form, the outside diameter of the coil is 80 centimeters, the internal diameter is 40 centimeters and the cooling water space is about 2 millimeters wide at each side. The liner, the core and the splitter ring must be a non-magnetic and dielectric material so as not to be affected by the magnetic field produced by the magnet. In a particular application, a fiber glass liner bonded with an epoxy resin was found satisfactory for use with a plurality of materials. The fiber glass epoxy liner is essentially impervious to acid and akaline pulps and provides good wearing characteristics. The core 16 may effectively be made of non-magnetic and dielectric ceramic or plastic material molded in the general form shown so as to provide a wide opening at the top of the core decreasing to a minimum opening at the bottom. This provides a type of venturi effect to maintain a constant time rate of change of volume and in effect bring particles of the pulp into a stronger magnetic field from the interior portion of the annular path around the core. The splitter ring 17 may also be made of a non-magnetic and dielectric ceramic or fiber glass-epoxy or other plastic construction and it is spaced to split the concentrate which is adjacent the liner and the depleted slurry or tailings which is adjacent the core 16. The design of the plug prevents cavitation in the flow path and provides in effect a laminar flow through the magnetic field. Turbulent flow is detrimental to the separation desired, particularly as the slurry approaches the splitter ring.

The construction of the coil is illustrated in FIG. 6 where a plurality of split washers or annular plates such as 20, 21 and 22 are arranged with the fissure in each plate above the fissure in the lower one. These washers are made of thin sheet copper and are coated with an insulating varnish, such as glyptal, of necessary insulating thickness. In making the coil, the washer 20 is superimposed above washer 21 with its two ends 20a and 20b above ends 21a and 21b. The end 20b is welded to the end 21a. The free end 21b of washer 21 is welded to the end 22a of the washer 22. This is continued down through the coil so that the finished coil is in effect a helix of copper plates. In the size of coil indicated above, 300 plates are welded together to form the coil; however, the number of coils may vary as determined by the material being treated. When the coil is completed, the free end of the upper plate and the free end of the lower plate form connectors for the coil and power leads are secured to these two free ends. After the coil is completed, it may be placed between heavy brass annular plates which may, also, be used as bus bars for the coil and which are secured together with bolts; the plates, bolts and necessary insulators not being shown. Since the coil is subjected to a tremendous force, such plates and the bolts are intended to hold the coil together.

The design of the coil, as specified above in size and construction, involves the use of about 100 kw. electrical power at maximum field strength. This involves powering the coil during about ¼ of each cycle of commercial alternating current. The powering of a coil is graphically illustrated in FIG. 4 where one cycle of an alternating current is shown extending from 0 to 360 electrical degrees. By means of an on-off circuit, described below, the power to the coil is started at about 90 electrical degrees on the positive side and is automatically shut off at 180 electrical degrees so that only about a quarter of the cycle is used for firing the coil in each cycle, with the firing starting at maximum voltage. The power is supplied at about 300 amps., 440 v., through a solid state switching circuit such as shown in FIG. 3.

Figure 3:
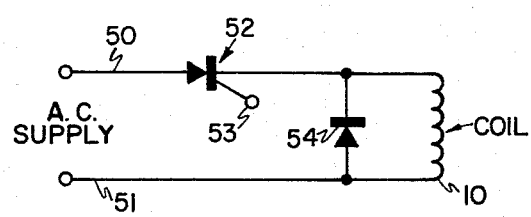
FIG. 3 is a schematic wiring diagram of one means of powering a magnet according to the invention.
Figure 4:
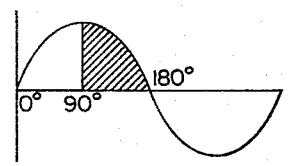
FIG. 4 is a graphical representation of a voltage curve of a cycle of an alternating current, showing the portion for charging a magnet of the invention and the off-voltage portion of each cycle.

In the diagram of FIG. 3 the A.C. power supply is attached to leads 50 and 51 which are interconnected with the coil 10. A silicon controlled rectifier 52 is controlled by a drive circuit 53, which in the size required in the above described coil is a 2-volt 80-milliamp gate signal adjusted to automatically permit firing of the coil at a predetermined point on the voltage cycle, in this case at 90 electrical degrees. The silicon rectifier shuts off on reversing the alternating current, that is, when the current reaches zero potential, it shuts off. Such drive circuits are known along with the timing circuitry for opening and closing a circuit for this type of control. A diode 54 is placed across the lines 51 and 52 to dissipate the stored energy in the coil on collapse of the magnetic field when the voltage is shut off. The diagram is, in effect, an on and off control, and the solid state device 52 is a silicon controlled rectifier and 54 is a silicon rectifier, both of which are known in the industry. With this circuitry, the small control signal from the drive unit 53 controls the gate of the rectifier 52. For one purpose of a separator according to the invention, the firing is conducted only on the positive voltage swing and then for the duration of the positive voltage as depicted by the upper portion of the sine wave. Depending upon the characteristics of the material being handled, the firing of the coil may be performed in any portion of one-half of the voltage cycle.

The pulsed magnetic field permits the magnet to operate at extreme current densities without overheating. The radial current distribution created by pulsed operation enhances the magnetic field characteristics inasmuch as the initial current path is around the inside edge of the coil giving a high field gradient near the inner edge of the magnet.

In one form of the device shown in FIG. 5, a coil 10 is provided around a liner 30 which has a sloping annular bottom 31 and a lower concentrate outlet 32. The annular liner 30 is provided with a feed hopper 35 having an overflow 36 providing a constant feed head for the separator. Between the magnet and the liner 30 is a cooling water jacket 38 having an inlet 39 and an outlet 40. The ceramic plug 16 is mounted internally of the annular liner 30 and positioned to control the flow of a feed pulp through the separator. The splitter ring 17 is mounted on a wall 42 which extends down to the lower wall 31 of the annular liner 30 and provides means for separating the concentrate and the tailings. The tailings which pass internally of the splitter ring 17 pass into a tank 43 having a lower tailings outlet 44 while the concentrate passes into the annular liner 30 and out the concentrate discharge 32. A feed of slurry or pulp is fed into the hopper or feed box 35 and it is maintained at a constant head by the overflow 36 which may be recycled back into the feed box. Power is supplied to the coil to produce a pulsed field and the slurry is passed through the separator. The concentrate is collected from the outlet 32 and the tailings discharged as desired.

In a typical separation, a feed pulp from a tailing discharge of a molybdenum sulfide beneficiating plant was initially fed through conventional magnetic separators and screened to remove any tramp iron and oversize wood chips. The tailings are flotation tailings of about 28–400 mesh size and include oxidized molybdenum minerals as well as mixed ores which were not susceptible to the sulfide flotation. It also includes other minerals not susceptible to the sulfide flotation. The conventional magnetic separators may be contact separators to remove the tramp iron and any highly magnetic susceptible mineral grains. This initial magnetic separation may be performed in any of the known magnetic separators currently available on the market. Such separators cannot separate minerals of low magnetic susceptibility but do remove the material detrimental to the high gauss field separator of this invention.

The device of FIG. 5 is obviously not intended as a complete beneficiation circuit; however, it indicates the type of apparatus which may be provided in a complete recovery circuit. A single pass through such a device will produce a rougher concentrate from an initial feed material of low value. This concentrate may then be upgraded, by passing it through another similar separator, i.e. a cleaner circuit, and where necessary, it may be further upgraded in cleaner circuits.

The solenoid of the invention has a high gradient, i.e. a very sharp drop in magnetic field strength from the inner surface of the solenoid toward the center. The drop in field strength occurs most rapidly near the inner surface of the solenoid with the rate of change diminishing to the center of the solenoid. The flow of feed is in the area of the sharpest drop of field strength producing an effective separation. The necessary field strength is dependent on the characteristics of the material being separated. Generally, however, the higher the magnetic susceptibility of the material, the lower the field necessary for separation or concentration. For the higher magnetically susceptible materials, somewhat lower field strengths are used to prevent damage to the timer and solenoid.

The current which may be used for the device includes an alternating current with a frequency in a range of from 20 to 400 cycles per second. It is preferable, however, for most ores to maintain a range in the 40–80 cycle range or simply commercial 60 cycle current which pulses a magnetic field with a period of time between the maximum points of magnetic field intensity to permit particles to move a sufficient distance laterally to the pulp flow to produce a concentrate. At the higher cycles, particles, and particularly larger ones, do not have sufficient time to move laterally in the pulp flow toward or away from the magnetic field to cause concentration and release of the particles to be washed out as a concentrate.

Materials of low magnetic susceptibility which may be utilized in the separator include many ores or other materials containing values. These values may be such metals as iron alone as a compound or with other metals which may include nickel, cobalt, manganese, tungsten, certain uranium, vanadium and other elements. In instances, magnetically susceptible material may carry along non-magnetically susceptible values as an inclusion. Several magnetically susceptible materials may be compounded or complexed or otherwise included in the molybdenum ore application described above, the tailings also include tungsten compounds as well as complexes which are susceptible to the ultra high gauss field and the concentrate includes the upgraded weakly susceptible values of the ores.

The apparatus has been described with a plug shaped to provide a venturi effect in an annular flow path. Certain applications may require utilizing less than the full annulus as where fin-like projections are used to space the plug in the liner. The plug may be made cylindrical and the fins shaped with increasing thickness to produce a venturi effect in a series of flow paths around the plug.

The pulse of current provides means for a continuous separation or concentration process. During periods of no voltage flow into the coil, the flow of the carrier fluid progressively washes the magnetically susceptible material as well as the non-magnetic material toward the outlet, with the magnetically susceptible material remaining near or adjacent the outer wall. Any material repulsed by the magnetic field moves toward and remains near or adjacent the plug.

While the invention has been described with reference to a specific device, there is no intent to limit the spirit or scope of the invention to the precise details so set forth, except as defined in the following claims.

We claim:
1. The method of concentrating more magnetically susceptible metallic values from a suspension of such values with other less magnetically susceptible materials in a fluid which comprises passing said suspension through a tubular member having an annular electric coil mounted around the outside of a portion of said tubular member in close proximity thereto, subjecting such a suspension to the influence of a pulsed magnetic field produced by powering said electric coil with an alternating current to maximum current density for a fraction of one polarity side of a complete cycle and then turning off the power to the coil until powered during a similar fraction of each succeeding cycle to segregate the more magnetically susceptible values in a predetermined portion of the suspension, and then collecting a concentrate of the more magnetically susceptible metallic values.

2. The method of claim 1 wherein the coil is powered for about the same quarter of each cycle.

3. The method of claim 1 wherein the alternating current has a frequency of from 20–400 cycles per second.

4. The method of concentraing more magnetically susceptible mineral values from a suspension of such values with other less magnetically susceptible materials in a fluid which comprises passing such a suspension through a tubular member in an annular stream in close proximity to the inner surface of an annular solenoid mounted around the outside of a portion of said tubular member and in closely spaced relation thereto, producing a pulsed magnetic field in said solenoid by powering said solenoid to maximum current density for a first predetermined time and then turning off the power to said solenoid for a second predetermined time which is substantially longer than the first predetermined time for powering the solenoid to segregate the more magnetically susceptible values in a portion of said stream nearest the inner surface of said solenoid, and then collecting a concentrate of the more magnetically susceptible values from said portion near said inner surface of said solenoid.

5. The method of claim 4 wherein said solenoid is powered by an alternating current and the power is applied to said solenoid for a portion of the cycle and the current is shut off during the remainder of the cycle so that there is no reverse of polarity in said solenoid.

6. The method of concentrating more magnetically susceptible metallic values from a suspension of such values with other less magnetically susceptible materials in a fluid which comprises passing such a suspension through a tubular member in an annular stream in close proximity to the inner surface of an annular solenoid mounted around the outside of a portion of said tubular member and in closely spaced relation thereto, producing a pulsed magnetic field in said solenoid by powering said solenoid with an alternating current having a frequency of from 20–80 cycles per second to maximum current density for about one-quarter of each cycle without a change in polarity in said solenoid and without power during the rest of each cycle to segregate the more magnetically susceptible values in a portion of said suspension nearest said inner surface of said solenoid, and recovering the resultant concentrate of the more magnetically susceptible values from said portion near said inner surface.

7. The method of claim 6 wherein a liquid suspension of metallic values is passed substantially vertically through said magnetic field.

8. Apparatus for concentrating magnetically susceptible values from a fluid suspension thereof comprising an upright tubular member, means providing an annular passage adjacent the wall of said tubular member, means for feeding a stream of suspension containing magnetically susceptible values into one end of said annular passage, an annular solenoid mounted around the outside of a portion of said tubular member with the inner surface of said solenoid in close proximity to said tubular member, means for periodically charging said solenoid with a current of electricity in the range of from 20 to 400 cycles per second for a first predetermined time and then completely shutting off the electricity after each period of charging for a second predetermined period of time so that there is no reversal of polarity in said solenoid to segregate such values in said flow adjacent the outer portion thereof, a splitter mounted adjacent one end of said tubular member opposite said field end for dividing the flow of suspension through said tubular member into two annular flows, and collector means separately collecting said divided flows.

9. Apparatus according to claim 8 in which feed is passed from the top to the bottom thereof.

10. Apparatus for concentrating magnetically susceptible values from a fluid suspension thereof comprising a diamagnetic tubular member, a diamagnetic core mounted in said tubular member and arranged to provide an annular passage adjacent the wall of said tubular member, means for feeding a stream of suspension containing magnetically susceptible values into one end of said tubular member, an annular solenoid mounted around the outside of a portion of said tubular member with the inner surface of said solenoid in close proximity to said tubular member, an alternating current source in the range of from 20 to 400 cycles per second electrically interconnected with said solenoid, means for periodically charging said solenoid with said current of electricity for less than one-half of each complete cycle without polarity change in said solenoid and for completely shutting off the electricity to said solenoid for the remainder of each cycle to separate such magnetically susceptible values in the outer portion of said annular passage, a splitter ring mounted adjacent the end opposite the feed end of said tubular member for dividing the flow of suspension through said tubular member into two annular flows, and collector means separately collecting said divided flows.

References Cited by the Examiner

UNITED STATES PATENTS

| | | | |
|---|---|---|---|
| 731,040 | 6/1903 | Gates | 209—212 |
| 940,282 | 11/1909 | Rogers | 209—212 |
| 998,486 | 7/1911 | Fauntleroy | 209—224 X |
| 1,024,538 | 4/1912 | Weatherby | 209—224 |
| 1,024,539 | 4/1912 | Weatherby | 209—224 |
| 1,417,189 | 5/1922 | McCarthy | 209—212 |
| 1,829,565 | 10/1931 | Lee | 209—212 |
| 1,934,923 | 11/1933 | Heinrich | 55—139 X |
| 2,504,858 | 4/1950 | Mackenzie | 55—139 |
| 2,542,035 | 2/1951 | Klemperer | 55—139 |
| 2,672,208 | 3/1954 | Van Hoesen | 55—139 |
| 2,711,248 | 6/1955 | Roe | 210—222 X |
| 2,904,178 | 9/1959 | Wintermute | 209—216 |
| 3,006,472 | 10/1961 | Clute | 209—214 |
| 3,068,628 | 12/1962 | Balzer et al. | 55—100 |

FOREIGN PATENTS

| | | |
|---|---|---|
| 265,834 | 10/1913 | Germany. |
| 297,585 | 5/1917 | Germany. |
| 301,929 | 11/1929 | Great Britain. |

OTHER REFERENCES

Solid State Products, Inc., Bulletin D–420–02–12–59: "A Survey of Some Circuit Applications of the Silicon Controlled Switch and Silicon Controlled Rectifiers," pp. 9, 15–17, and 22–24.

REUBEN FRIEDMAN, *Primary Examiner.*

ROBERT F. BURNETT, *Examiner.*

J. DECESARE, D. TALBERT, *Assistant Examiners.*